(12) United States Patent
Liu et al.

(10) Patent No.: US 11,765,688 B2
(45) Date of Patent: *Sep. 19, 2023

(54) DATA TRANSMISSION METHOD, DEVICE, BASE STATION, TERMINAL AND READABLE STORAGE MEDIUM

(71) Applicant: ZTE CORPORATION, Guangdong (CN)

(72) Inventors: Xu Liu, Guangdong (CN); Bo Dai, Guangdong (CN); Xiubin Sha, Guangdong (CN); Ting Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,181

(22) Filed: Sep. 2, 2022

(65) Prior Publication Data

US 2022/0417902 A1    Dec. 29, 2022

Related U.S. Application Data

(63) Continuation of application No. 17/056,629, filed as application No. PCT/CN2019/088382 on May 24, 2019, now Pat. No. 11,470,576.

(30) Foreign Application Priority Data

May 25, 2018 (CN) .......................... 201810516124.3

(51) Int. Cl.
*H04W 68/02* (2009.01)
*H04W 74/08* (2009.01)
*H04W 72/21* (2023.01)
*H04W 72/23* (2023.01)

(52) U.S. Cl.
CPC .......... *H04W 68/02* (2013.01); *H04W 72/21* (2023.01); *H04W 72/23* (2023.01); *H04W 74/0833* (2013.01)

(58) Field of Classification Search
CPC ..... H04W 68/02; H04W 72/21; H04W 72/23; H04W 74/0833; H04W 76/11; H04W 8/26; H04W 56/0045; H04W 8/28; H04W 56/0005; H04W 68/005; H04W 72/1273; Y02D 30/70
USPC ........................................................ 455/458
See application file for complete search history.

(56) References Cited

U.S. PATENT DOCUMENTS

| 2014/0233538 A1* | 8/2014 | Zhang | H04W 72/0446 370/336 |
| 2016/0270028 A1* | 9/2016 | Lee | H04W 4/70 |
| 2019/0116628 A1* | 4/2019 | Xu | H04W 68/00 |
| 2019/0349883 A1* | 11/2019 | Fujishiro | H04W 76/27 |

* cited by examiner

*Primary Examiner* — Hirdepal Singh
(74) *Attorney, Agent, or Firm* — KDW Firm PLLC

(57) ABSTRACT

Provided are a data transmission method and device, a base station, a terminal and a readable storage medium. The data transmission method includes: a base station determines whether a terminal resides in a cell of the base station; in a case where the base station determines that the terminal resides in the cell of the base station, the base station sends a paging message to the terminal, wherein the paging message carries a cell radio network temporary identifier (C-RNTI); and the base station transmits downlink data according to the C-RNTI.

16 Claims, 10 Drawing Sheets

DATA TRANSMISSION METHOD, DEVICE, BASE STATION, TERMINAL AND READABLE STORAGE MEDIUM

CROSS-REFERENCES TO RELATED APPLICATIONS

This is a Continuation Application of U.S. application Ser. No. 17/056,629, which is a National Stage Application, filed under 35 U.S.C. 371, of International Patent Application No. PCT/CN2019/088382, filed on May 24, 2019, which is based on and claims priority to Chinese patent application No. 201810516124.3 filed on May 25, 2018, disclosure of which is incorporated herein by reference in its entirety.

TECHNICAL FIELD

Embodiments of the present disclosure relate to the field of communications and, in particular, to a data transmission method and device, a base station, a terminal and a readable storage medium.

BACKGROUND

In the related protocols, when downlink data sent to a terminal by a base station reaches a mobility management entity (MME), the sending of a paging message is triggered. The paging message carries a UE (e.g. a terminal) paging identity (e.g. IMSI/S-TMSI) and a tracking area identity (TAI), and is sent to the base station through an S1 interface. The base station calculates a paging occasion (PO) according to the UE paging identity carried in the paging message, and sends the paging message on the corresponding PO. After the UE successfully monitors and receives the paging message, an initial random access process is initiated. After completing the access and entering a connection state, the UE may receive the downlink data. For downlink data traffic, especially the downlink small packet data traffic, the UE is required to establish a connection and enter a connection state each time when the packet data is received. This not only causes wastes of radio resources, but also increases the power consumption of the terminal. It is an urgent problem to be solved that how the terminal can efficiently receive the downlink data.

SUMMARY

Embodiments of the present disclosure provide a data transmission method and device, a base station, a terminal and a readable storage medium, so as to solve the problem that the process of sending and receiving downlink data is complicated in the related art.

To solve the above technical problem, an embodiment of the present disclosure provides a data transmission method. The method includes the steps described below. A second channel characteristic hypothesis of a control channel resource set configured by a second communication node is received. The control channel resource set is formed by a first type of search space and/or a second type of search space. The second channel characteristic hypothesis is used for configuring a control channel resource in the second type of search space.

A control channel resource sent by the second communication node is received according to the second channel characteristic hypothesis.

An embodiment of the present disclosure further provides a data transmission method. The method includes the steps described below.

A base station determines whether a terminal resides in a cell of the base station.

In a case where the base station determines that the terminal resides in the cell of the base station, the base station sends a paging message to a terminal. The paging message carries a cell radio network temporary identifier (C-RNTI).

The base station transmits downlink data according to the C-RNTI.

An embodiment of the present disclosure further provides a data transmission method. The method includes the steps described below.

A terminal receives a paging message sent by a base station. The paging message carries a cell radio network temporary identifier (C-RNTI).

The terminal receives downlink data sent by the base station according to the C-RNTI.

An embodiment of the present disclosure further provides a data transmission device applied to a base station. The device includes a paging sending module and a downlink sending module.

The paging sending module is configured to determine whether a terminal resides in a cell of the base station, and in a case where it is determined that the terminal resides in the cell of the base station, carry a C-RNTI in a paging message sent to a terminal.

The downlink sending module is configured to transmit downlink data according to the C-RNTI. In an embodiment, the paging sending module is further configured to in a case where it is determined that the terminal does not reside in the cell of the base station, send a paging message to the terminal, wherein the paging message does not carry the C-RNTI and is used to instruct the terminal to initiate a random access process.

An embodiment of the present disclosure further provides a data transmission device. The device includes a paging receiving module and a downlink receiving module.

The paging receiving module is configured to receive a paging message sent by a base station.

The paging message carries a cell radio network temporary identifier (C-RNTI).

The downlink receiving module is configured to receive, according to the C-RNTI, downlink data sent by the base station.

An embodiment of the present disclosure further provides a base station. The base station includes a first processor, a first memory and a first communication bus.

The first communication bus is configured to implement connection and communication between the first processor and the first memory.

The first processor is configured to execute a computer program stored in the first memory, so as to perform the steps of the data transmission methods above.

An embodiment of the present disclosure further provides a terminal. The terminal includes a second processor, a second memory and a second communication bus.

The second communication bus is configured to implement connection and communication between the second processor and the second memory.

The second processor is configured to execute a computer program stored in the second memory, so as to perform the steps of the data transmission methods above.

An embodiment of the present disclosure further provides a computer readable storage medium. The computer readable storage medium stores at least one program executable by at least one processor to implement the steps of the data transmission methods above.

The embodiments of the present disclosure have the beneficial effects described below.

The embodiments of the present disclosure provide a data transmission method and device, a base station, a terminal and a readable storage medium. A paging message is sent to a terminal, where the paging message carries a cell radio network temporary identifier (C-RNTI). Then, downlink data is transmitted according to the C-RNTI. In this way, the transmission of the downlink data is indicated by directly carrying the C-RNTI in the paging message. Compared with the related art in which the paging message is firstly sent and then the C-RNTI is sent by initiating an initial random access process, this solution significantly improves the efficiency, implements the efficient transmission of the downlink data, and also reduces the power consumption of the terminal and the occupancy rate of radio resources.

Other features of the embodiments of the present disclosure and corresponding beneficial effects are set forth later in the description. It should be understood that at least part of the beneficial effects become apparent from the description of the present disclosure.

DETAILED DESCRIPTION

To illustrate the objects, solutions and advantages of the present disclosure clearer, embodiments of the present disclosure are described in detail hereinafter through various implementations in conjunction with drawings. It is to be understood that the embodiments described herein are merely intended to explain the present disclosure, and are not intended to limit the present disclosure.

Embodiment One

Figure 1:
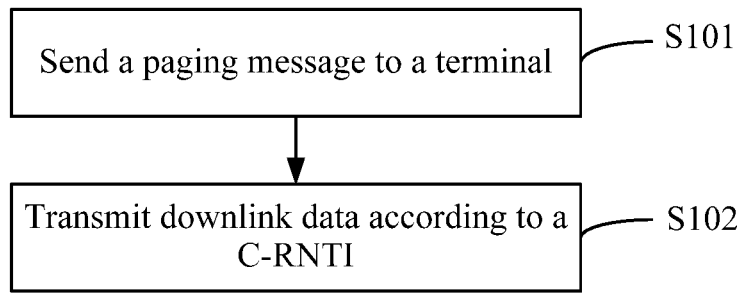
FIG. 1 is a flowchart of a data transmission method according to embodiment one of the present disclosure.

Referring to FIG. 1, FIG. 1 is a flowchart of a data transmission method according to embodiment one of the present disclosure. The method includes the steps described below.

In step S101, a paging message is sent to a terminal. The paging message carries a cell radio network temporary identifier (C-RNTI).

In step S102, downlink data is transmitted according to the C-RNTI.

The C-RNTI is a dynamic identifier allocated to the UE by the base station, and uniquely identifies the UE over an air interface of a cell. Information interaction between the base station and the terminal may be implemented according to this identifier. When the base station sends the downlink data to the terminal, an MME is involved. The MME is a key control node of an LTE access network in the 3GPP protocol, and is in charge of positioning and paging a UE that is in an idle mode, including a relay function. Simply speaking, the MME is in charge of signaling processing. The MME sends a paging message to the base station through an S1 interface. The S1 interface is a communication interface between an LTE eNodeB (e.g. a base station) and an evolved packet core network (EPC), and divides an LTE system into two parts including a radio access network and a core network. In this embodiment, the step of sending the paging message to the terminal is performed by the base station after the MME sends the paging message to the base station through the S1 interface.

In some embodiments, before the step of sending the downlink data according to the C-RNTI, the method may further include sending downlink scheduling information DL-grant to the terminal. The downlink scheduling information may be used to indicate the sending situation of the downlink data. For example, the downlink scheduling information may indicate a corresponding physical downlink shared channel (PDSCH) resource. Correspondingly, the step of transmitting the downlink data according to the C-RNTI may include sending the downlink data on the physical downlink shared channel resource corresponding to the downlink scheduling information. Alternatively, the step of transmitting the downlink data according to the C-RNTI may include sending message MSG4 on a resource corresponding to the downlink scheduling information, completing the random access process according to message MSG4, and transmitting the downlink data. The difference between the two modes is that the downlink scheduling information sent to the terminal may indicate not only the sending of the downlink data, but also the sending of message MSG4 for establishing the random access process. MSG4 is message 4, which is a message in an establishment process of a physical random access channel (PRACH). After message 4 is sent through the downlink scheduling information, the establishment process of the random access process is completed, so that the downlink data may be sent to the terminal.

Figure 2:
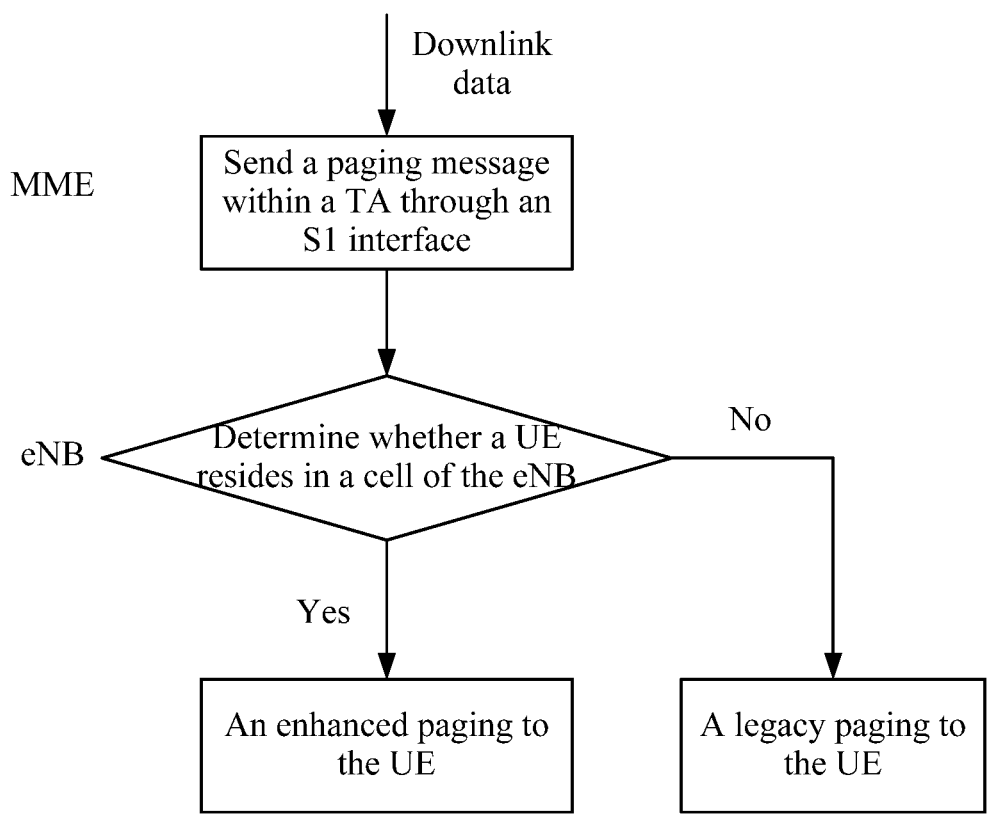
FIG. 2 is a diagram showing paging transmission according to various embodiments of the present disclosure.

In some embodiments, after the base station receives the paging message sent by the MME through the S1 interface, the base station may further determine whether the enhanced paging method in this embodiment of the present disclosure is applicable to the UE, that is, whether the corresponding paging message sent by the base station in the data transmission method in this embodiment of the present disclosure is applicable to the UE. If the enhanced paging method is applicable to the UE, the transmission may be performed by using the mode of sending the paging message according to the data transmission method in this embodiment of the present disclosure. However, if the enhanced paging method is applicable to the UE, the transmission is still performed by using a legacy paging method. Referring to FIG. 2, after the downlink data reaches the MME, the MME may send paging messages to all base stations within a tracking area (TA) through the S1 interface. After a base station in the TA receives the paging through the S1 interface, it is determined, according to the implement behaviors of the base station, whether the terminal resides in a cell of the base station. If the base station determines that the terminal may reside in the cell, the eNB performs the enhanced paging process. Otherwise, if the base station determines the terminal does not reside in the cell, the legacy paging, that is, the legacy paging process, is performed.

In some embodiments, the step of sending the downlink scheduling information to the terminal may include carrying the downlink scheduling information DL-grant in the paging message. That is, the base station pages the UE through the allocated C-RNTI and the DL-grant carried in the paging message. Correspondingly, the resource for transmitting the downlink data is configured by the DL-grant, and the base station sends the downlink data on the PDSCH resource corresponding to the DL-grant; after the UE receives the paging message carrying the C-RNTI and the DL-grant, the downlink data is received on the PDSCH resource corresponding to the DL-grant by using the C-RNTI. Alternatively, the resource for sending MSG4 in the establishment process of the PRACH is configured by the DL-grant, and the base station sends MSG4 on the resource corresponding to the DL-grant; after the UE receives the paging message carrying the C-RNTI and the DL-grant, MSG4 is received on the resource corresponding to the DL-grant by using the C-RNTI, the random access process is completed, and then, the downlink data is transmitted.

In some embodiments, the step of sending the downlink scheduling information to the terminal may include sending the downlink scheduling information through a physical downlink control channel. That is, the base station pages the UE through the allocated C-RNTI carried in the paging message, while the downlink scheduling information is sent in other modes. Correspondingly, the base station sends, through the PDCCH, the downlink scheduling information DL-grant of the PDSCH for transmitting the downlink data, and then, the downlink data is sent on the PDSCH resource indicated by the DL-grant; after the UE receives the paging message carrying the C-RNTI, the DL-grant on the PDCCH is monitored, and the downlink data is received in the indicated PDSCH resource position. Alternatively, the base station sends, through the PDCCH, the downlink scheduling information DL-grant for transmitting MSG4 and then sends MSG4; after the UE receives the paging message carrying the C-RNTI, the PDCCH is monitored and MSG4 is received in the indicated resource position, so that the random access process is completed, and then, the downlink data is received. MSG4 is a fourth message of the random access process.

In some embodiments, the step of transmitting the downlink data according to the C-RNTI may further include directly carrying the downlink data in the paging message. In the case where the amount of the downlink (DL) data is small, the downlink data may be directly added into the paging message and then sent to the terminal, thus further eliminating the establishment process of the random access.

In some embodiments, the method may further include carrying uplink scheduling information in the paging message; and receiving at least one of feedback information of the downlink data, uplink data, a buffer status report (BSR) request or message MSG3 sent by the terminal according to a resource position configured in the uplink scheduling information. The terminal may feed back for the downlink data by using the uplink scheduling information, or the terminal directly sends the uplink data by using the uplink scheduling information, or the terminal sends the buffer status report (BSR) request by using the uplink scheduling information, or the terminal sends message MSG3 by using the uplink scheduling information, and then, the subsequent random access process is completed.

In some embodiments, the method may further include carrying timing advance information (e.g. time synchronization information) in the paging message. Correspondingly, the step of transmitting the downlink data according to the C-RNTI may further include transmitting the downlink data according to the C-RNTI and the timing advance information. In the case where the base station and the terminal are in time synchronization, that is, in a static terminal scenario, the downlink data may be transmitted by using the above data transmission method without the TA value. However, if the base station and the terminal are not in time synchronization, the data may be transmitted by using the TA value. The timing advance information may be, for example, in the case where the terminal is in a terminal scenario of aggregated geographical positions, timing advance information corresponding to any terminal in the terminal scenario.

In the terminal scenario of aggregated geographical positions, after a certain UE performs a complete PRACH process, the base station acquires and saves the value of time synchronization information TA with respect to the UE. Since geographical positions of these terminals are aggregated together, TA values between these terminals may be regarded as the same. After receiving the paging message through the S1 interface, the base station determines whether a corresponding TA value of a UE is stored. If there is the corresponding TA value of the UE, the eNB pages the UE through the allocated C-RNTI, the corresponding DL-grant and the TA carried in the paging message. For example, in one way, the resource for transmitting the downlink data is configured by the DL-grant, and the base station sends the downlink data on the PDSCH resource corresponding to the DL-grant; after the UE receives the paging message carrying the C-RNTI and the DL-grant, the downlink data is received on the PDSCH resource corresponding to the DL-grant by using the C-RNTI. In another way, the resource for sending MSG4 in the establishment process of the PRACH is configured by the DL-grant, and the base station sends MSG4 on the resource corresponding to the DL-grant; after the UE receives the paging message carrying the C-RNTI and the DL-grant, MSG4 is received on the resource corresponding to the DL-grant by using the C-RNTI, the random access process is completed, and then, the downlink data is received.

In an embodiment, the base station may further page the UE through the allocated C-RNTI and the TA value carried in the paging message. For example, in one way, the base station sends, through the PDCCH, the downlink scheduling information DL-grant of the PDSCH for transmitting the downlink data, and then, the downlink data is sent on the PDSCH resource; after the UE receives the paging message carrying the C-RNTI, the PDCCH is monitored, and then, the downlink data is received in the indicated PDSCH resource position. In another way, the base station sends, through the PDCCH, the downlink scheduling information DL-grant for transmitting MSG4 and sends MSG4; after the UE receives the paging message carrying the C-RNTI, the PDCCH is monitored and MSG4 is received in the indicated resource position, so that the random access process is completed, and then, the downlink data is received.

In an embodiment, the base station may further page the UE through the allocated C-RNTI, the corresponding uplink scheduling information UL-grant and the TA carried in the paging message. In an embodiment, the eNB may use the paging message to carry the DL data.

In an embodiment, after the UE receives the paging message carrying the allocated C-RNTI, the corresponding UL-grant and the corresponding DL data, in one way, the corresponding C-RNTI is used to send an acknowledge/negative acknowledge (ACK/NACK) in the resource position configured in the corresponding UL-grant, so as to complete a feedback for downlink data reception; in another way, if there is uplink small packet data traffic at this time, the sending of the uplink data may be directly completed by using the corresponding UL-grant; in another way, if there is uplink data to be sent at this time, the BSR request may be sent by using the corresponding UL-grant; and in another way, the UE sends message MSG3 by using the UL-grant, and then, the subsequent PRACH process is completed.

In some embodiments, before the step of carrying the time advance information in the paging message, the method may further include determining sharing status of the timing advance information in each terminal, that is, the TA management in the terminal scenario of aggregated geographical positions. Exemplarily, the step of determining the sharing status of the timing advance information may include triggering the positioning of the terminal; acquiring position information of the terminal; and determining, according to position information of each terminal, a terminal sharing the timing advance information. The object that triggers the positioning of the terminal may be the terminal, or an equipment at a network side, such as the base station or the MME. After the positioning of the terminal is triggered, the network side may acquire the position information of the terminal mainly through the MME, and then, the MME may inform the eNB of the position information of the UE, and the eNB manages the position information of each UE and determines a group of UEs that may share the TA value. After receiving the paging message issued by the MME, the eNB determines which UEs may share the TA in the next paging process, that is, the TA value is brought to users in the group through paging00.

Alternatively, after acquiring the position information of the UE, the MME manages the position information of the UE. When the MME sends the paging message to the base station through the S1 interface, the position information of the UE may be brought to the eNB at the same time, and the eNB determines which UEs may share the TA in the next paging process, that is, the TA value is brought to the users in the group through paging.

This embodiment provides a data transmission method. A paging message is sent to a terminal, where the paging message carries a cell radio network temporary identifier (C-RNTI). Then, downlink data is transmitted according to the C-RNTI. In this way, the transmission of the downlink data is indicated by directly carrying the C-RNTI in the paging message. Compared with the related art in which the paging message is firstly sent and then the C-RNTI is sent by initiating an initial random access process, this solution significantly improves the efficiency, implements the efficient transmission of the downlink data, and also reduces the power consumption of the terminal and the occupancy rate of radio resources.

Embodiment Two

Figure 3:
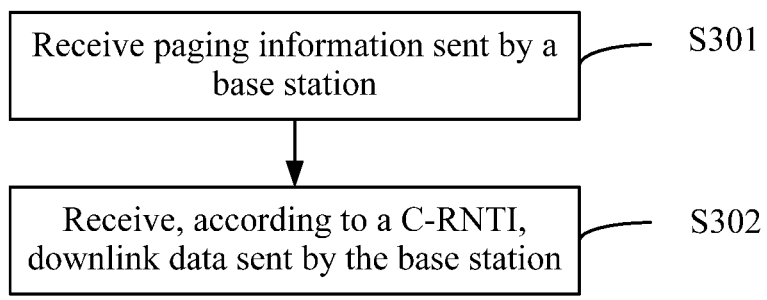
FIG. 3 is a flowchart of a data transmission method according to embodiment two of the present disclosure.

Referring to FIG. 3, FIG. 3 is a flowchart of a data transmission method according to embodiment two of the present disclosure. The method includes the steps described below.

In step S301, a paging message sent by a base station is received. The paging message carries a cell radio network temporary identifier (C-RNTI).

In step S302, downlink data sent by the base station is received according to the C-RNTI.

In some embodiments, the method may further include receiving downlink scheduling information sent by the base station.

The step of receiving, according to the C-RNTI, the downlink data sent by the base station includes the step described below.

The downlink data is received on a physical downlink shared channel resource corresponding to the downlink scheduling information.

Alternatively, message MSG4 is received on a resource corresponding to the downlink scheduling information, a random access process is completed according to message MSG4, and the downlink data is transmitted.

In some embodiments, the step of transmitting the downlink data according to the C-RNTI may further include the step described below.

The downlink data is directly carried in the paging message.

In some embodiments, the method may further include the steps described below.

Uplink scheduling information is carried in the paging message.

Feedback information of the downlink data is sent according to a resource position configured in the uplink scheduling information.

Alternatively, uplink data is sent according to a resource position configured in the uplink scheduling information.

Alternatively, a BSR request is sent according to a resource position configured in the uplink scheduling information.

Alternatively, message MSG3 is sent according to a resource position configured in the uplink scheduling information, and a random access process is completed according to message MSG3.

In some embodiments, the method may further include the step described below.

Timing advance information is carried in the paging message.

The step of transmitting the downlink data according to the C-RNTI may further include the step described below.

The downlink data sent by the base station is received according to the C-RNTI and the timing advance information.

In some embodiments, the timing advance information may be, for example, in the case where the terminal is in a terminal scenario of aggregated geographical positions, timing advance information corresponding to any terminal in the terminal scenario.

In some embodiments, before the step of carrying the timing advance information in the paging message, the method may further include the step described below.

Sharing status of the timing advance information in each terminal is determined.

This embodiment provides a data transmission method. A paging message sent by a base station is received, where the paging message carries a cell radio network temporary identifier (C-RNTI). Then, downlink data is transmitted according to the C-RNTI. In this way, the transmission of the downlink data is indicated by directly carrying the C-RNTI in the paging message. Compared with the related art in which the paging message is firstly sent and then the C-RNTI is sent by initiating an initial random access process, this solution significantly improves the efficiency, implements the efficient transmission of the downlink data, and also reduces the power consumption of the terminal and the occupancy rate of radio resources.

Embodiment Three

Figure 4:
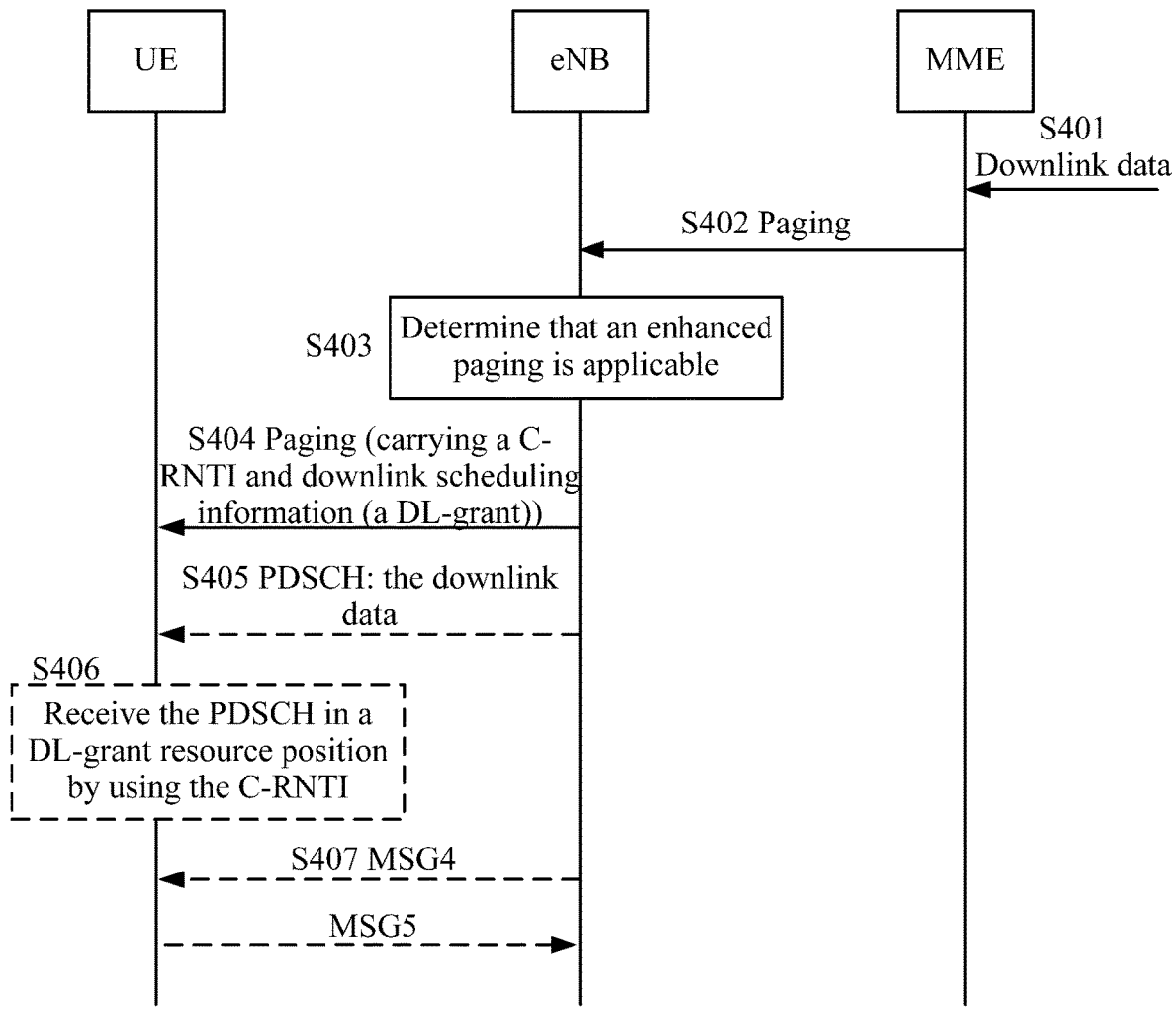
FIG. 4 is a diagram showing a signal flow of a data transmission method according to embodiment three of the present disclosure.

Referring to FIG. 4, FIG. 4 is a flowchart of a data transmission method according to embodiment three of the present disclosure. In a static terminal scenario, a paging message may carry a C-RNTI and a DL-grant to complete the transmission of downlink data.

In step S401, downlink data sent by a base station reaches an MME.

In step S402, the MME initiates a paging message to the base station through an S1 interface.

In step S403, after receiving the paging message through the S1 interface, the base station determines whether an enhanced paging method is applicable to a UE.

In step S404, if the enhanced paging method is applicable to the UE, the eNB pages the UE through an allocated C-RNTI and a DL-grant carried in a paging message.

In step S405, in one way, a resource for transmitting the downlink data is configured by the DL-grant, and the base station sends the downlink data on the PDSCH resource corresponding to the DL-grant.

In step S406, after the UE receives the paging message carrying the C-RNTI and the DL-grant, the downlink data is received on the PDSCH resource corresponding to the DL-grant by using the C-RNTI.

In step S407, in another way, a resource for sending MSG4 in a PRACH process is configured by the DL-grant, and the base station sends MSG4 on the resource corresponding to the DL-grant; after the UE receives the paging message carrying the C-RNTI and the DL-grant, MSG4 is received on the resource corresponding to the DL-grant by using the C-RNTI, a random access process is completed, and then, the downlink data is received.

Embodiment Four

Figure 5:
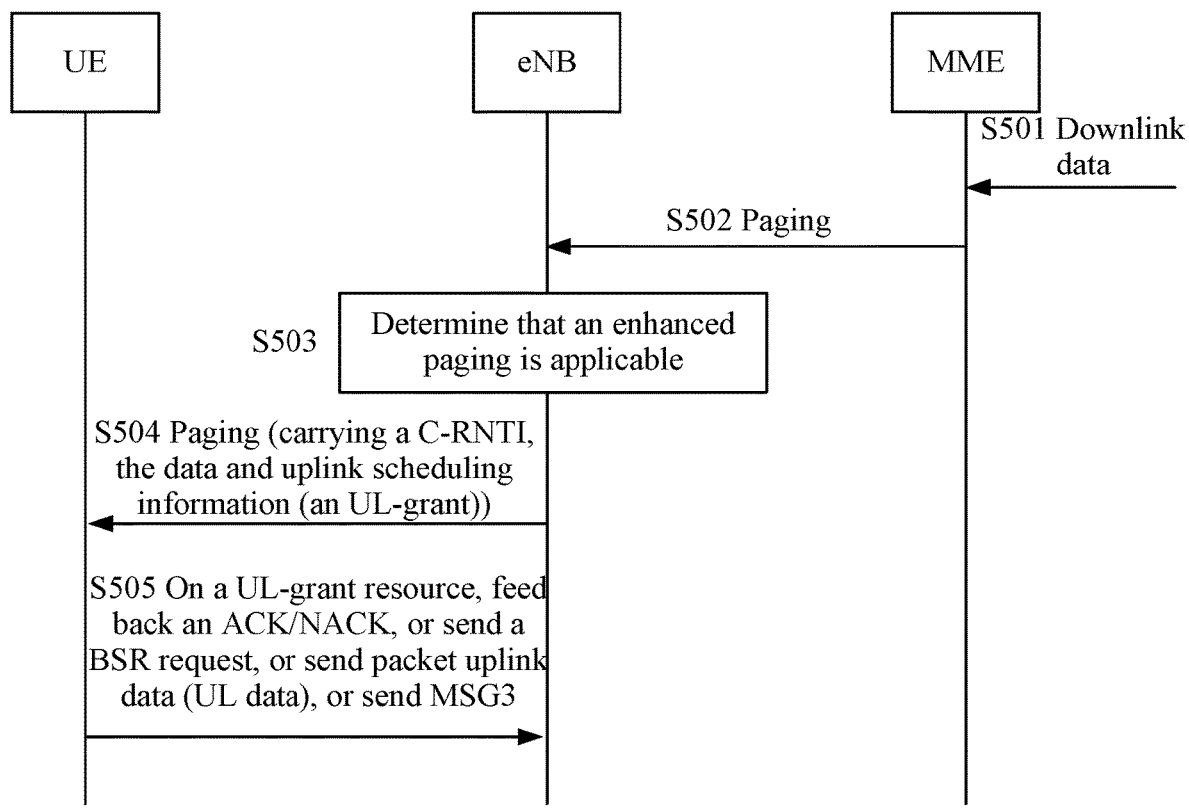
FIG. 5 is a diagram showing a signal flow of a data transmission method according to embodiment four of the present disclosure.

Referring to FIG. 5, FIG. 5 is a diagram showing a signal flow of a data transmission method according to embodiment four of the present disclosure. In a static terminal scenario, a paging message may carry a C-RNTI, data and an UL-grant to complete the transmission of downlink data.

In step S501, downlink data sent by a base station reaches an MME.

In step S502, the MME initiates a paging message to the base station through an S1 interface.

In step S503, after receiving the paging message through the S1 interface, a base station determines whether an enhanced paging method is applicable to a UE.

In step S504, if the enhanced paging method is applicable to the UE, the eNB pages the UE through an allocated C-RNTI and a UL-grant carried in a paging message. In an embodiment, the eNB may use the paging message to carry the DL data at the same time.

In step S505, after the UE receives the paging message carrying the C-RNTI, the UL-grant and the DL data, in one way, the C-RNTI is used to send an ACK/NACK in a resource position configured in the UL-grant, so as to complete a feedback for downlink data reception; in another way, if there is uplink small packet data traffic at this time, the uplink data may be directly sent by using the UL-grant; in another way, if there is uplink data to be sent at this time, a BSR request may be sent by using the UL-grant; and in another way, the UE sends message MSG3 by using the UL-grant, so as to complete a subsequent PRACH process.

Embodiment Five

Figure 6:
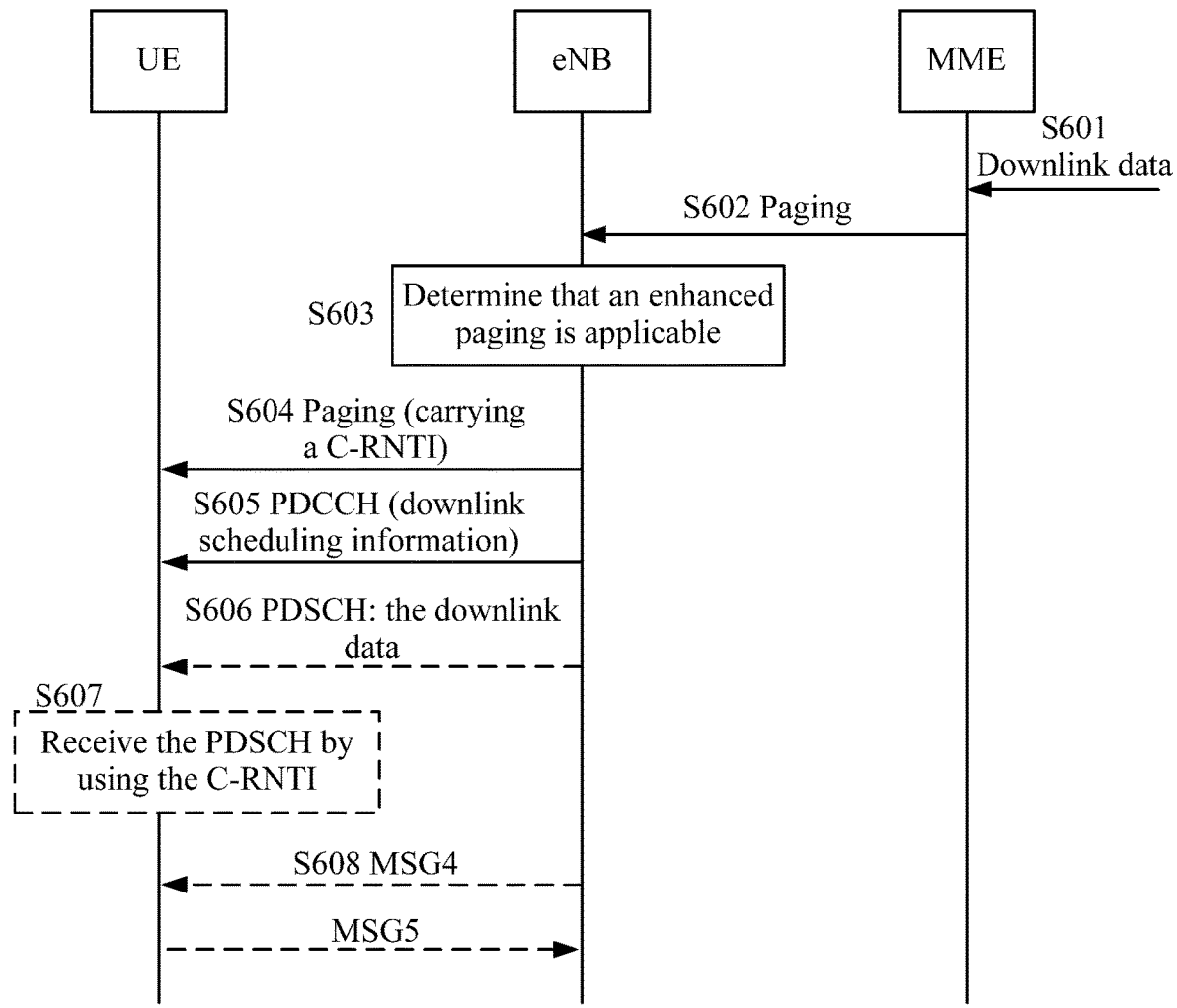
FIG. 6 is a diagram showing a signal flow of a data transmission method according to embodiment five of the present disclosure.

Referring to FIG. 6, FIG. 6 is a flowchart of a data transmission method according to embodiment five of the present disclosure. In a static terminal scenario, a paging message may carry a C-RNTI to complete the transmission of downlink data.

In step S601, downlink data sent by a base station reaches an MME.

In step S602, the MME initiates a paging message to the base station through an S1 interface.

In step S603, after receiving the paging message through the S1 interface, the base station determines whether an enhanced paging method is applicable to a UE.

In step S604, if the enhanced paging method is applicable to the UE, the eNB pages the UE through an allocated C-RNTI carried in the paging message.

S605, in one way, the base station sends, through a PDCCH, downlink scheduling information (a DL-grant) of a PDSCH for transmitting the downlink data.

In step S606, the downlink data is then sent on the PDSCH resource.

In step S607, after the UE receives the paging message carrying the C-RNTI, the PDCCH is monitored, and then, the downlink data is received in the indicated PDSCH resource position.

In step S608, in another way, the base station sends, through a PDCCH, downlink scheduling information DL-grant for transmitting MSG4 and MSG4 is sent. After the UE receives the paging message carrying the C-RNTI, the PDCCH is monitored and MSG4 is received in the indicated resource position, so that a random access process is completed, and then, the downlink data is received.

Embodiment Six

Figure 7:
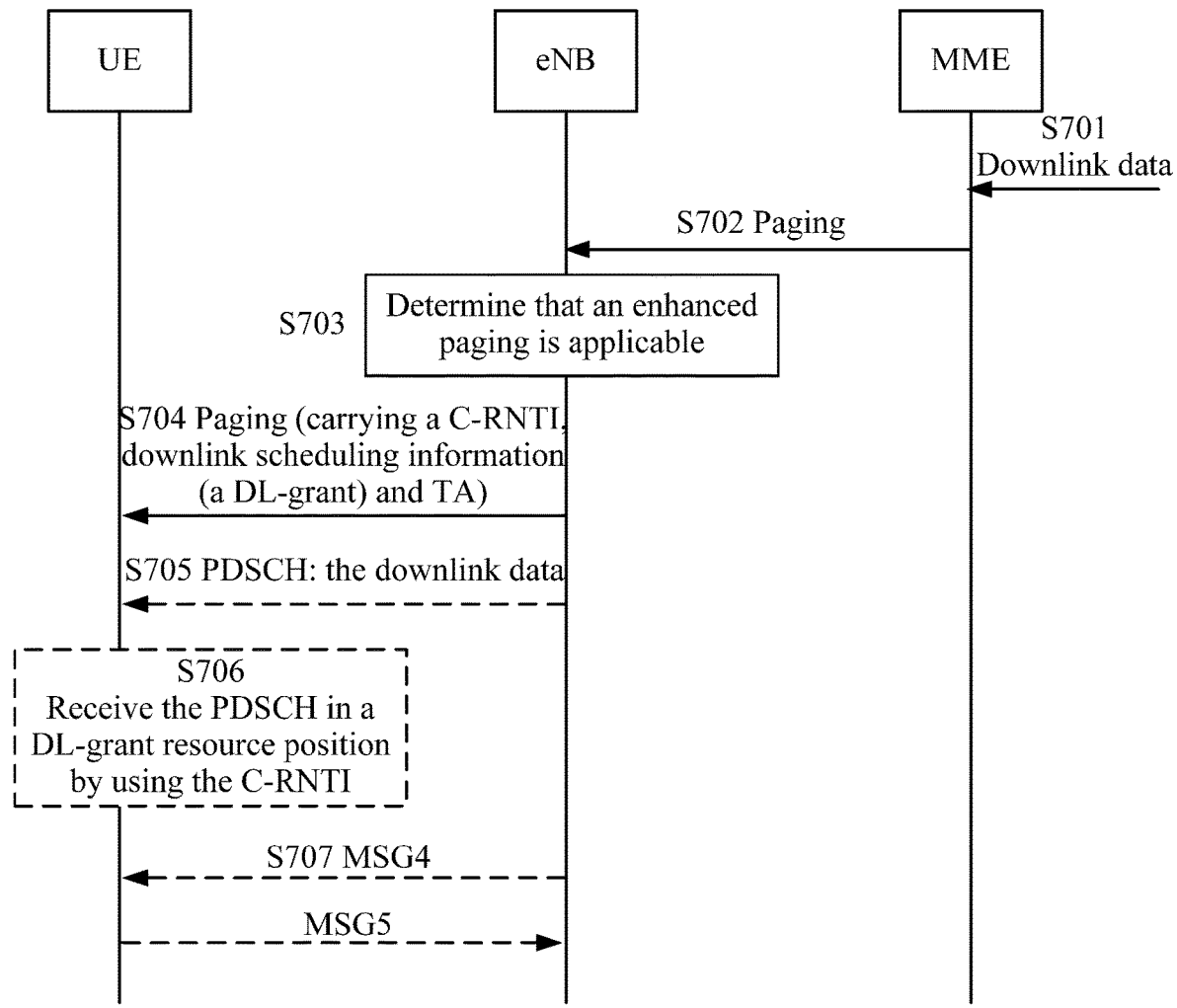
FIG. 7 is a diagram showing a signal flow of a data transmission method according to embodiment six of the present disclosure.

Referring to FIG. 7, FIG. 7 is a diagram showing a signal flow of a data transmission method according to embodiment six of the present disclosure. In a terminal scenario of aggregated geographical positions, a paging message may carry a corresponding C-RNTI, a corresponding. DL-grant and timing advance (TA) to complete the transmission of downlink data.

In step S701, downlink data sent by a base station reaches an MME.

In step S702, the MME initiates a paging message to the base station through an S1 interface.

In step S703, after receiving the paging message through the S1 interface, the base station determines whether an enhanced paging method is applicable to a UE. In the terminal scenario of aggregated geographical positions, after a certain UE performs a complete PRACH process, the base station acquires and saves the value of time synchronization information TA with respect to the UE. Since geographical positions of terminals are aggregated together, TA values between these terminals may be regarded as the same. After receiving the paging message through the S1 interface, the base station determines whether the TA value of the UE has been stored.

In step S704, if the enhanced paging method is applicable to the UE and the base station has stored the TA value of the UE, the eNB pages the UE through an allocated C-RNTI, a corresponding DL-grant and the TA carried in a paging message.

In step S705, in one way, a resource for transmitting the downlink data is configured by the DL-grant, and the base station sends the downlink data on the PDSCH resource corresponding to the DL-grant.

In step S706, after the UE receives the paging message carrying the C-RNTI and the DL-grant, the downlink data is received on the PDSCH resource corresponding to the DL-grant by using the C-RNTI.

In step S707, in another way, a resource for sending MSG4 in an establishment process of a PRACH is configured by the DL-grant, and the base station sends MSG4 on the resource corresponding to the DL-grant; after the UE receives the paging message carrying the C-RNTI and the DL-grant, MSG4 is received on the resource corresponding to the DL-grant by using the C-RNTI, a random access process is completed, and then, the downlink data is received.

Embodiment Seven

Figure 8:
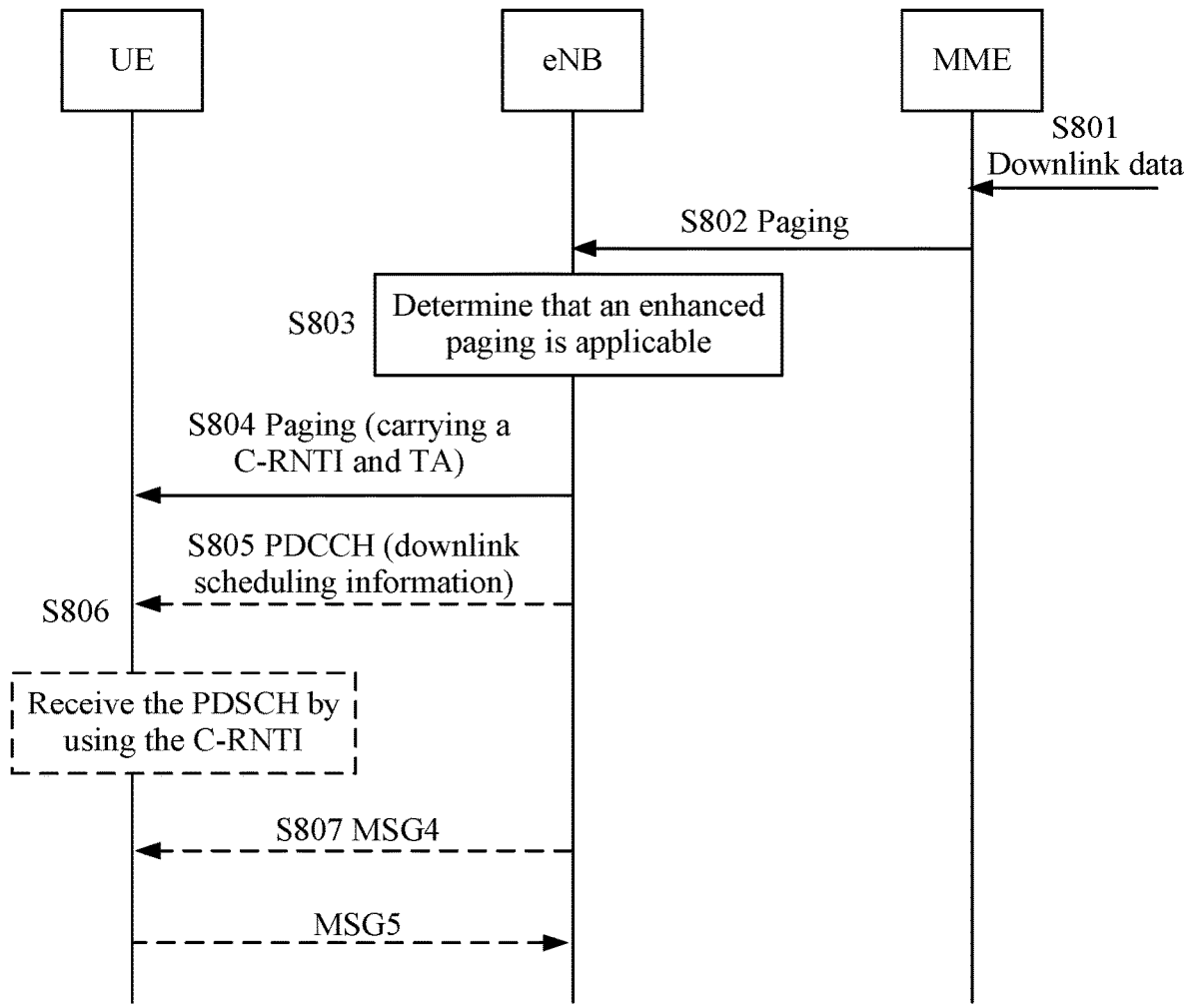
FIG. 8 is a diagram showing a signal flow of a data transmission method according to embodiment seven of the present disclosure.

Referring to FIG. 8, FIG. 8 is a diagram showing a signal flow of a data transmission method according to embodiment seven of the present disclosure. In a terminal scenario of aggregated geographical positions, a paging message may carry a corresponding C-RNTI and timing advance (TA) to complete the transmission of downlink data.

In step S801, downlink data sent by a base station reaches an MME.

In step S802, the MME initiates a paging message to the base station through an S1 interface.

In step S803, after receiving the paging message through the S1 interface, the base station determines whether an enhanced paging method is applicable to a UE. In the terminal scenario of aggregated geographical positions, after a certain UE performs a complete PRACH process, the base station acquires and saves the value of time synchronization information TA with respect to the UE. Since address positions of terminals are aggregated together, TA values between these terminals may be regarded as the same. After receiving the paging message through the S1 interface, the base station determines whether the TA value of the UE has been stored.

In step S804, if the enhanced paging method is applicable to the UE and the base station has stored the TA value of the UE, the eNB pages the UE through the TA, and an allocated C-RNTI carried in a paging message.

In step S805, in one way, the base station sends, through a PDCCH, a downlink scheduling information DL-grant of a PDSCH for transmitting the downlink data, and then, the downlink data is sent on the PDSCH resource.

In step S806, after the UE receives the paging message carrying the C-RNTI, the PDCCH is monitored, and the downlink data is received in the indicated PDSCH resource position.

In step S807, in another way, the base station sends, through a PDCCH, downlink scheduling information DL-grant for transmitting MSG4 and MSG4 is sent. After the UE receives the paging message carrying the C-RNTI, the PDCCH is monitored and MSG4 is received in the indicated resource position, a random access process is completed, and then, the downlink data is received.

Embodiment Eight

Figure 9:
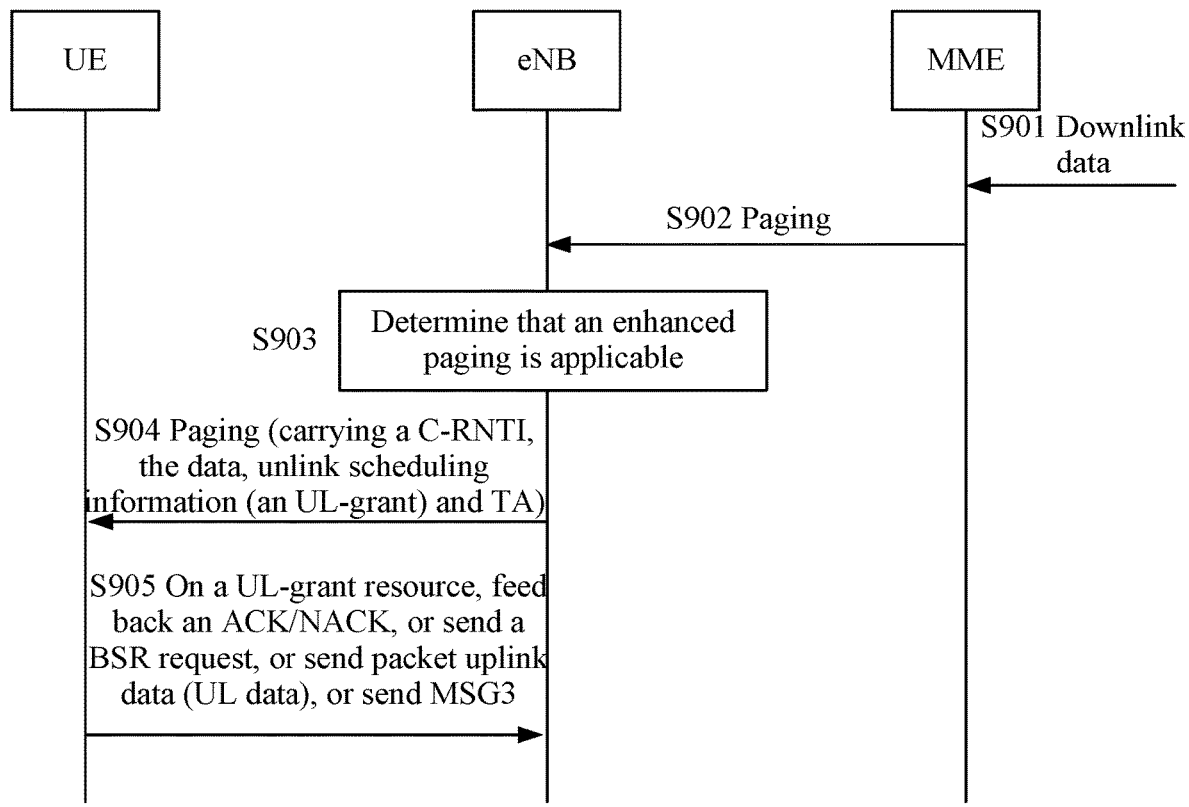
FIG. 9 is a diagram showing a signal flow of a data transmission method according to embodiment eight of the present disclosure.

Referring to FIG. 9, FIG. 9 is a diagram showing a signal flow of a data transmission method according to embodiment eight of the present disclosure. In a terminal scenario of aggregated geographical positions, a paging message may carry a corresponding C-RNTI, a corresponding UL-grant and timing advance (TA) to complete the transmission of downlink data.

In step S901, downlink data sent by a base station reaches an MME.

In step S902, the MME initiates a paging message to the base station through an S1 interface.

In step S903, after receiving the paging message through the S1 interface, the base station determines whether an enhanced paging method is applicable to a UE. In the terminal scenario of aggregated geographical positions, after a certain UE performs a complete PRACH process, the base station acquires and saves the value of time synchronization information TA with respect to the UE. Since geographical positions of terminals are aggregated together, TA values between these terminals may be regarded as the same. After receiving the paging message through the S1 interface, the base station determines whether the TA value of the UE has been stored.

In step S904, if the enhanced paging method is applicable to the UE and the base station has stored the TA value of the UE, the eNB pages the UE through the TA, an allocated C-RNTI and a corresponding UL-grant carried in a paging message. In an embodiment, the eNB may use the paging message to carry the DL data at the same time.

In step S905, after the UE receives the paging message carrying the allocated C-RNTI, the corresponding UL-grant and the corresponding DL data, in one way, the corresponding C-RNTI is used to send an ACK/NACK in a resource position configured in the corresponding UL-grant, so as to complete a feedback for downlink data reception; in another way, if there is uplink small packet data traffic at this time, the uplink data may be directly sent by using the corresponding UL-grant; in another way, if there is uplink data to be sent at this time, a BSR request may be sent by using the UL-grant; and in another way, the UE uses the UL-grant to send message MSG3, so as to complete a subsequent PRACH process.

Embodiment Nine

Figure 10:
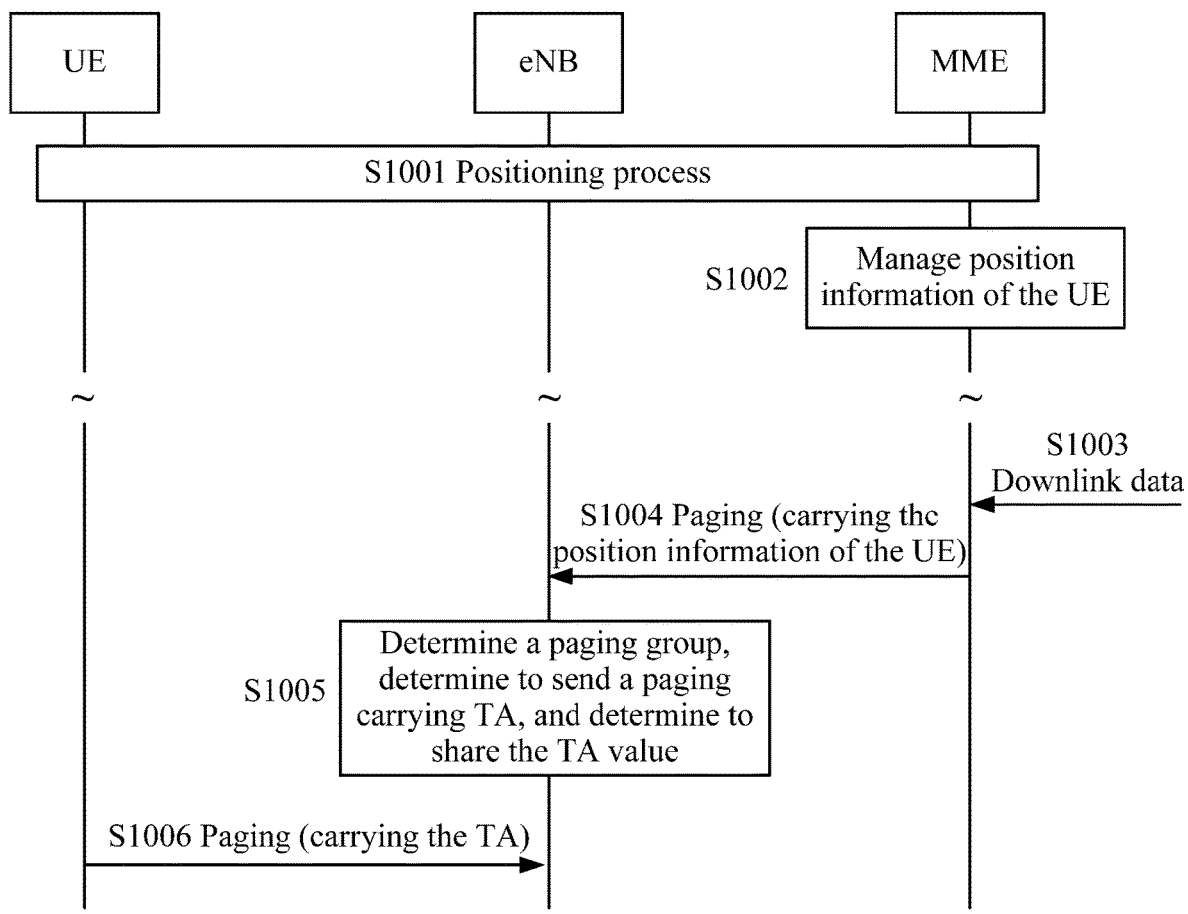
FIG. 10 is a diagram showing a signal flow of a timing advance (TA) management method according to embodiment nine of the present disclosure.

Referring to FIG. 10, FIG. 10 is a diagram showing a signal flow of a timing advance (TA) management method in a terminal scenario of aggregated geographical positions according to embodiment nine of the present disclosure.

In step S1001, a network side triggers the positioning or a UE triggers the positioning, and an MME acquires position information of the UE.

In step S1002, the MME manages the position information of the UE.

In step S1003, downlink data sent by a base station reaches the MME.

In step S1004, the MME initiates a paging message to a base station through an S1 interface, and when the MME sends the paging message through the S1 interface, the position information of the UE is also brought to the eNB.

In step S1005, the eNB determines which UEs may share the TA in the next paging process, that is, the TA value is brought to users in a group through pagings.

In step S1006, the eNB determines, according to the acquired position information of the UE, whether to send a paging carrying the TA, or directly send a legacy paging message.

Embodiment Ten

Figure 11:
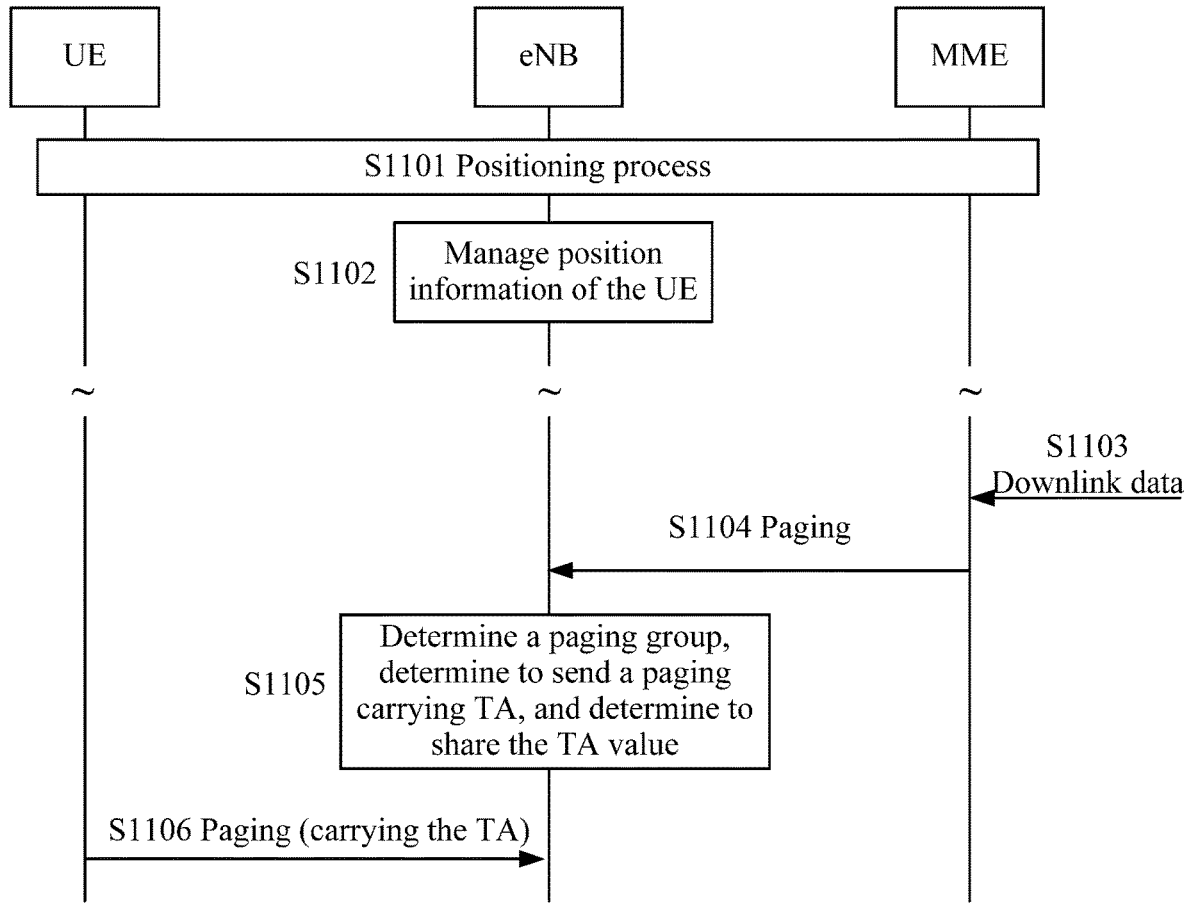
FIG. 11 is a diagram showing a signal flow of a timing advance (TA) management method according to embodiment ten of the present disclosure.

Referring to FIG. 11, FIG. 11 is a diagram showing a signal flow of a timing advance (TA) management method in a terminal scenario of aggregated geographical positions according to embodiment ten of the present disclosure.

In step S1101, a network side triggers the positioning or a UE triggers the positioning, and an MME acquires position information of the UE.

In step S1102, the MME informs an eNB of the position information of the UE, and the eNB manages position information of each UE.

In step S1103, downlink data sent by a base station reaches the MME.

In step S1104, the MME initiates a paging message to the base station through an S1 interface.

In step S1005, the eNB determines which UEs may share the TA in the next paging process, that is, the TA value is brought to users in a group through paging.

In step S1106, the eNB determines, according to the acquired position information of the UE, whether to send a paging carrying the TA, or directly send a legacy paging message.

Embodiment Eleven

Figure 12:
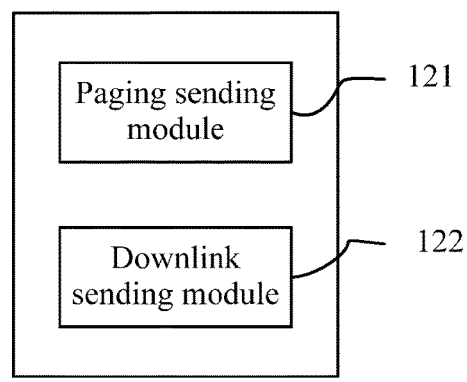
FIG. 12 is a structural diagram of a data transmission device according to embodiment eleven of the present disclosure.

Referring to FIG. 12, FIG. 12 is a structural diagram of a data transmission device according to this embodiment. The device includes a paging sending module 121 and a downlink sending module 122.

The paging sending module 121 is configured to carry a C-RNTI in a paging message sent to a terminal.

The downlink sending module 122 is configured to transmit downlink data according to the C-RNTI.

In some embodiments, the device may be further configured to send downlink scheduling information DL-grant to the terminal.

In some embodiments, the step of sending the downlink scheduling information to the terminal may include carrying the downlink scheduling information DL-grant in the paging message. That is, the base station pages the UE through the DL-grant and the allocated C-RNTI carried in the paging message.

In some embodiments, the step of sending the downlink scheduling information to the terminal may include sending the downlink scheduling information through a physical downlink control channel.

In some embodiments, the step of transmitting the downlink data according to the C-RNTI may further include directly carrying the downlink data in the paging message.

In some embodiments, the device may be further configured to carry uplink scheduling information in the paging message; and receive at least one of feedback information of the downlink data, uplink data, a buffer status report (BSR) request or message MSG3 sent by the terminal according to a resource position configured in the uplink scheduling information.

In some embodiments, the device may be further configured to carry timing advance information (e.g. time synchronization information) in the paging message. Correspondingly, the step of transmitting the downlink data according to the C-RNTI may further include transmitting the downlink data according to the C-RNTI and the timing advance information.

In some embodiments, before the step of carrying the time advance information in the paging message, the device may be further configured to determine sharing status of the timing advance information in each terminal, that is, the TA management in a terminal scenario of aggregated geographical positions. Exemplarily, the step of determining the sharing status of the timing advance information may include triggering the positioning of the terminal; acquiring position information of the terminal; and determining, according to position information of each terminal, a terminal sharing the timing advance information.

Embodiment Twelve

Figure 13:
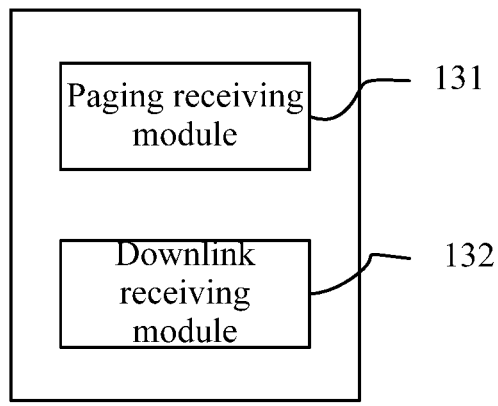
FIG. 13 is a structural diagram of a data transmission device according to embodiment twelve of the present disclosure.

Referring to FIG. 13, FIG. 13 is a structural diagram of a data transmission device according to this embodiment. The device includes a paging receiving module 131 and a downlink receiving module 132. The paging receiving module 131 is configured to receive a paging message sent by a base station. The paging message carries a cell radio network temporary identifier (C-RNTI).

The downlink receiving module 132 is configured to receive, according to the C-RNTI, downlink data sent by the base station.

In some embodiments, the device may be further configured to receive downlink scheduling information sent by the base station.

The step of receiving, according to the C-RNTI, the downlink data sent by the base station includes the step described below.

The downlink data is received on a physical downlink shared channel resource corresponding to the downlink scheduling information.

Alternatively, message MSG4 is received on a resource corresponding to the downlink scheduling information, a random access process is completed according to message MSG4, and the downlink data is transmitted.

In some embodiments, the step of receiving, according to the C-RNTI, the downlink data sent by the base station may further include the step described below.

The downlink data is directly carried in the paging message.

In some embodiments, the device may be further configured to perform the step described below. Uplink scheduling information is carried in the paging message.

Feedback information of the downlink data is sent according to a resource position configured in the uplink scheduling information.

Alternatively, uplink data is sent according to a resource position configured in the uplink scheduling information.

Alternatively, a BSR request is sent according to a resource position configured in the uplink scheduling information.

Alternatively, message MSG3 is sent according to a resource position configured in the uplink scheduling information, and the random access process is completed according to message MSG3. In some embodiments, the device may be further configured to perform the step described below. Timing advance information is carried in the paging message.

The step of transmitting the downlink data according to the C-RNTI may further include the step described below.

The downlink data sent by the base station is received according to the C-RNTI and the timing advance information.

In some embodiments, the timing advance information may be, in the case where the terminal is in a terminal scenario of aggregated geographical positions, timing advance information corresponding to any terminal in the terminal scenario.

In some embodiments, before the step of carrying the timing advance information in the paging message, the device may be further configured to perform the step described below.

Sharing status of the timing advance information in each terminal is determined.

Embodiment Thirteen

Figure 14:
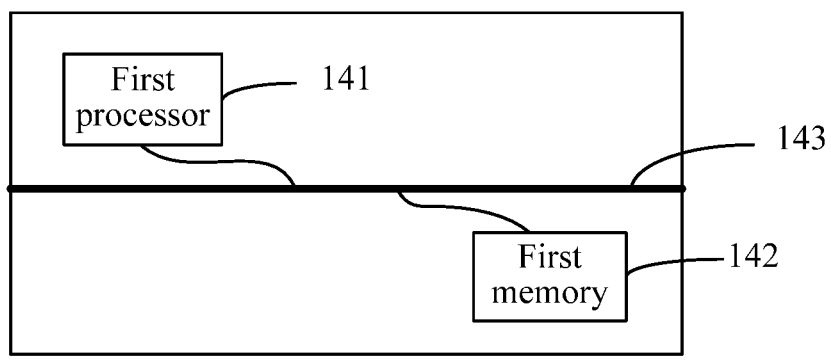
FIG. 14 is a structural diagram of a base station according to embodiment thirteen of the present disclosure.

Referring to FIG. 14, FIG. 14 is a structural diagram of a base station according to this embodiment. The base station includes a first processor 141, a first memory 142 and a first communication bus 143.

The first communication bus 143 is configured to implement connection and communication between the first processor 141 and the first memory 142.

The first processor 141 is configured to execute a computer program stored in the first memory 142, so as to perform the data transmission methods in various embodiments of the present disclosure, which are not repeated here.

Embodiment Fourteen

Figure 15:
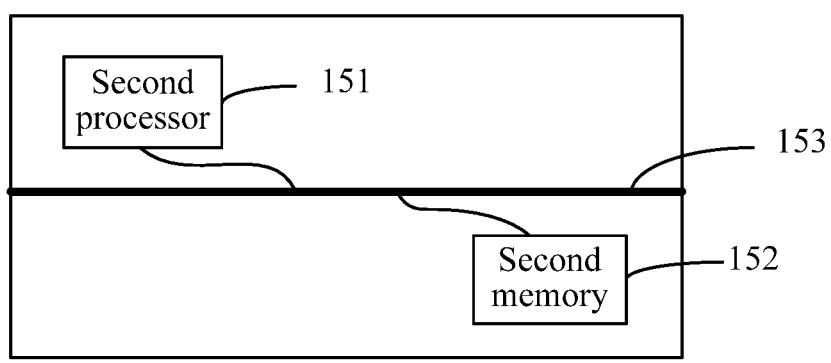
FIG. 15 is a structural diagram of a user equipment according to embodiment fourteen of the present disclosure.

Referring to FIG. 15, FIG. 15 is a structural diagram of a terminal according to this embodiment. The terminal includes a second processor 151, a second memory 152 and a second communication bus 153.

The second communication bus 153 is configured to implement connection and communication between the second processor 151 and the second memory 152.

The second processor 151 is configured to execute a computer program stored in the second memory 152, so as to perform the data transmission methods in various embodiments of the present disclosure, which are not repeated here.

Embodiment Fifteen

This embodiment provides a computer readable storage medium. The computer readable storage medium is configured to store one or more computer programs executable by one or more processors to implement the data transmission methods in various embodiments above, which are not repeated here.

Apparently, it should be understood by those skilled in the art that each of the modules or the steps in the present disclosure above may be implemented by a general-purpose computing device. The modules or the steps may be concentrated on a single computing device or distributed on a network composed of multiple computing devices. Alternatively, the modules or the steps may be implemented by program codes executable by the computing devices, so that the modules or the steps may be stored in a storage medium (such as a read-only memory (ROM)/random access memory (RAM), a magnetic disk or an optical disk) and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present disclosure is not limited to any specific combination of hardware and software.

The above content is a further detailed description of the present disclosure in conjunction with the specific embodiments, and the specific implementation of the present disclosure is not limited to the description. For those skilled in the art to which the present disclosure pertains, a number of simple deductions or substitutions not departing from the concept of the present disclosure may be made and should fall within the scope of the present disclosure.

What is claimed is:

1. A data transmission method, comprising: determining, by a base station, whether a terminal resides in a cell of the base station;
in a case where the base station determines that the terminal resides in the cell of the base station, sending, by the base station, a paging message to the terminal, wherein the paging message carries a cell radio network temporary identifier (C-RNTI); and
transmitting, by the base station, downlink data according to the C-RNTI;
wherein before the transmitting, by the base station, the downlink data according to the C-RNTI, the method further comprises sending, by the base station, downlink scheduling information to the terminal, wherein the downlink scheduling information is carried in the paging message; and
wherein the transmitting, by the base station, the downlink data according to the C-RNTI comprises:
sending, by the base station, the downlink data on a physical downlink shared channel resource corresponding to the downlink scheduling information; or
sending, by the base station, message MSG4 of a random access process on a physical downlink shared channel resource corresponding to the downlink scheduling information, and completing, by the base station, the random access process according to message MSG4.

2. The data transmission method of claim 1, further comprising:
carrying, by the base station, uplink scheduling information in the paging message; and
receiving, by the base station, at least one of feedback information of the downlink data, uplink data, a buffer status report (BSR) request or message MSG3 sent by the terminal according to a resource position configured in the uplink scheduling information.

3. The data transmission method of claim 1, wherein the method further comprises:
carrying, by the base station, timing advance information in the paging message; and
wherein transmitting, by the base station, the downlink data according to the C-RNTI further comprises:

transmitting, by the base station, the downlink data according to the C-RNTI and the timing advance information.

4. The data transmission method of claim 3, in response to the terminal being in a terminal scenario of aggregated geographical positions, the timing advance information being timing advance information corresponding to any terminal in the terminal scenario.

5. The data transmission method of claim 4, wherein before the carrying, by the base station, the timing advance information in the paging message, the method further comprises:
determining, by the base station, sharing status of the timing advance information in each terminal.

6. The data transmission method of claim 5, wherein the determining, by the base station, the sharing status of the timing advance information comprises:
triggering, by the base station or a Mobility Management Entity (MME), positioning of the terminal;
acquiring, by the base station, position information of the terminal; and
determining, by the base station, according to position information of the each terminal, a terminal sharing the timing advance information.

7. The data transmission method of claim 1, the method further comprising:
in a case where the base station determines that the terminal does not reside in the cell of the base station, sending, by the base station, a paging message to the terminal, wherein the paging message does not carry the C-RNTI and is used to instruct the terminal to initiate a random access process.

8. A base station, comprising a first processor, a first memory and a first communication bus; wherein
the first communication bus is configured to implement connection and communication between the first processor and the first memory; and
the first processor is configured to execute a computer program stored in the first memory, so as to perform the steps of the data transmission method of claim 1.

9. A data transmission method, comprising:
receiving, by a terminal, a paging message sent by a base station, wherein the paging message carries a cell radio network temporary identifier (C-RNTI); and
receiving, by the terminal, according to the C-RNTI, downlink data sent by the base station;
wherein the method further comprises receiving, by the terminal, downlink scheduling information sent by the base station, wherein the downlink scheduling information is carried in the paging message;
and wherein the receiving, by the terminal, according to the C-RNTI, the downlink data sent by the base station comprises:
receiving, by the terminal, the downlink data on a physical downlink shared channel resource corresponding to the downlink scheduling information; or
receiving, by the terminal, message MSG4 on a resource corresponding to the downlink scheduling information, and completing by the terminal, a random access process according to message MSG4.

10. The data transmission method of claim 9, wherein the paging message further carries uplink scheduling information; and the method further comprises:
sending, by the terminal, feedback information of the downlink data according to a resource position configured in the uplink scheduling information; or sending, by the terminal, uplink data according to a resource position configured in the uplink scheduling information; or
sending, by the terminal, a buffer status report (BSR) request according to a resource position configured in the uplink scheduling information; or
sending, by the terminal, message MSG3 according to a resource position configured in the uplink scheduling information, and completing, by the terminal, a random access process according to message MSG3.

11. The data transmission method of claim 9, wherein the paging message further carries timing advance information; and
wherein receiving, by the terminal, the downlink data according to the C-RNTI further comprises:
receiving, by the terminal, according to the C-RNTI and the timing advance information, the downlink data sent by the base station.

12. The data transmission method of claim 11, in response to the terminal being in a terminal scenario of aggregated geographical positions, the timing advance information being timing advance information corresponding to any terminal in the terminal scenario.

13. A terminal, comprising a second processor, a second memory and a second communications bus; wherein
the second communication bus is configured to implement connection and communication between the second processor and the second memory; and
the second processor is configured to execute a computer program stored in the second memory, so as to perform the steps of the data transmission method of claim 9.

14. A non-transitory computer readable storage medium, storing at least one computer program executable by at least one processor to implement the steps of the data transmission method of claim 1, or the steps of the data transmission method of claim 9.

15. A data transmission device, applied to a base station, wherein the data transmission device comprises:
a paging sending module, which is configured to determine whether a terminal resides in a cell of the base station, and in a case where it is determined that the terminal resides in the cell of the base station, carry a cell radio network temporary identifier (C-RNTI) in a paging message sent to a terminal; and
a downlink sending module, which is configured to transmit downlink data according to the C-RNTI;
the paging sending module is further configured to send downlink scheduling information to the terminal;
wherein the downlink sending module is configured to transmit downlink data according to the C-RNTI in the following manner:
sending the downlink data on a physical downlink shared channel resource corresponding to the downlink scheduling information, wherein the downlink scheduling information is carried in the paging message; or
sending message MSG4 of a random access process on a physical downlink shared channel resource corresponding to the downlink scheduling information, and completing, by the base station, the random access process according to message MSG4.

16. The data transmission device of claim 15, wherein the paging sending module is further configured to in a case where it is determined that the terminal does not reside in the cell of the base station, send a paging message to the terminal, wherein the paging message does not carry the C-RNTI and is used to instruct the terminal to initiate a random access process.

\* \* \* \* \*